United States Patent
Shim et al.

(10) Patent No.: US 11,994,194 B2
(45) Date of Patent: May 28, 2024

(54) POWERTRAIN FOR MOTORIZED VEHICLE

(71) Applicants: Hyundai Motor Company, Seoul (KR); Kia Corporation, Seoul (KR)

(72) Inventors: Hyu Tae Shim, Gyeonggi-do (KR); Jin Seung Lim, Seoul (KR); Jae Young Jeon, Gyeonggi-do (KR); Jun Seong Kang, Gyeonggi-do (KR); Jong Min Kim, Gyeonggi-do (KR); Jae Hun Jung, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 88 days.

(21) Appl. No.: 17/530,846

(22) Filed: Nov. 19, 2021

(65) Prior Publication Data
US 2023/0008891 A1    Jan. 12, 2023

(30) Foreign Application Priority Data
Jul. 6, 2021    (KR) .......................... 10-2021-0088697

(51) Int. Cl.
*B60K 17/02*    (2006.01)
*B60K 1/00*    (2006.01)
(Continued)

(52) U.S. Cl.
CPC ........... *F16H 37/0806* (2013.01); *B60K 1/00* (2013.01); *B60K 17/02* (2013.01); *B60K 17/08* (2013.01);
(Continued)

(58) Field of Classification Search
CPC .................. F16H 2200/2005–2017; F16H 2200/2035–2061; F16H 2200/0039; F16H 37/0806; F16H 3/52–72
See application file for complete search history.

(56) References Cited

U.S. PATENT DOCUMENTS 3,733,928 A * 5/1973 Uozumi ................... F16H 3/66
                                                     475/275
7,651,426 B2 * 1/2010 Yokoyama ............... B60K 6/52
                                                     475/19
(Continued)

FOREIGN PATENT DOCUMENTS

CN    111365424 A  *  7/2020
KR    10-2020-0080672 A   7/2020
(Continued)

*Primary Examiner* — Ernesto A Suarez
*Assistant Examiner* — Lillian T Nguyen
(74) *Attorney, Agent, or Firm* — Fox Rothschild LLP

(57) ABSTRACT

A powertrain for a motorized vehicle includes a motor shaft connected to a motor, a first input shaft configured to be selectively connected to the motor shaft and provided with a first driving gear mounted on the first input shaft, a second input shaft configured to be selectively connected to the motor shaft and provided with a second driving gear mounted on the second input shaft, a planetary gear set connected to the first input shaft and mounted so as to allow power from the motor shaft to be supplied via a plurality of paths, a first driven gear mounted to a differential and configured to mesh with the first driving gear, and a second driven gear mounted to the differential and configured to mesh with the second driving gear.

4 Claims, 18 Drawing Sheets

(51) Int. Cl.
    *B60K 17/08*     (2006.01)
    *F16H 3/62*     (2006.01)
    *F16H 37/08*     (2006.01)

(52) U.S. Cl.
    CPC .............................. *B60K 2001/001* (2013.01); *F16H 2200/0021* (2013.01); *F16H 2200/0039* (2013.01); *F16H 2200/2005* (2013.01); *F16H 2200/2038* (2013.01); *F16H 2200/2064* (2013.01); *F16H 2200/2066* (2013.01); *F16H 2200/2082* (2013.01); *F16H 2200/2094* (2013.01)

(56) References Cited

U.S. PATENT DOCUMENTS

| | | | |
|---|---|---|---|
| 2017/0136870 A1* | 5/2017 | Littlefield | B60K 6/365 |
| 2018/0154757 A1* | 6/2018 | Lee | F16H 37/04 |
| 2020/0173528 A1* | 6/2020 | Elpers | B60K 6/36 |
| 2021/0116021 A1* | 4/2021 | Kim | F16H 61/686 |

FOREIGN PATENT DOCUMENTS

| | | | | |
|---|---|---|---|---|
| KR | 20200129282 A | * | 11/2020 | B60K 6/547 |
| WO | WO-2018014481 A1 | * | 1/2018 | B60K 17/04 |

\* cited by examiner

FIG. 2

| CLASSIFICATION | | OPERATING ELEMENT | | |
|---|---|---|---|---|
| | | B1 | CL1 | CL2 |
| EV, REGENERATIVE BRAKING MODE | 1ST GEAR STAGE | O | | |
| | 2ND GEAR STAGE | | O | |
| | 3RD GEAR STAGE | | | O |

FIG. 9

| CLASSIFICATION | OPERATING ELEMENT | | |
|---|---|---|---|
| | B1 | DG1 | DG2 |
| 1ST GEAR STAGE | O | | |
| 2ND GEAR STAGE | | O | |
| 3RD GEAR STAGE | | | O |

FIG. 13

| CLASSIFICATION | | OPERATING ELEMENT | | |
|---|---|---|---|---|
| | | CL3 | CL1 | CL2 |
| EV, REGENERATIVE BRAKING MODE | 1ST GEAR STAGE | O | | |
| | 2ND GEAR STAGE | | O | |
| | 3RD GEAR STAGE | | | O |

# POWERTRAIN FOR MOTORIZED VEHICLE

CROSS-REFERENCE TO RELATED APPLICATION

This application claims under 35 U.S.C. § 119(a) the benefit of Korean Patent Application No. 10-2021-0088697, filed on Jul. 6, 2021 in the Korean Intellectual Property Office, the entire contents of which are incorporated herein by reference.

BACKGROUND

1. Technical Field

The present disclosure relates to a structure of a powertrain for a motorized vehicle such as an electric vehicle.

2. Description of the Related Art

Conventionally, a powertrain for an electric vehicle, which is constructed such that power of a motor is reduced in an external gear engagement manner and is transmitted to drive wheels, employs a structure having at least three shafts, thus occupying a comparatively large space when mounted in a vehicle. Therefore, there is a limitation to an extent to which a size of an indoor passenger compartment can be increased. Further, in the case of high-performance vehicles or large vehicles, it is difficult to satisfy performance requirements of the vehicle including acceleration and maximum speed using only one speed reduction ratio.

The information disclosed in this Background of the Disclosure section is only for enhancement of understanding of the general background of the disclosure, and should not be taken as an acknowledgement or any form of suggestion that this information forms the related art already known to a person skilled in the art.

SUMMARY

Therefore, the present disclosure provides a powertrain for a motorized vehicle, which has a comparatively compact construction, thereby improving mountability in a vehicle and enabling a sufficiently large indoor passenger compartment to be secured in the vehicle, and which provides a plurality of gear stages, thereby facilitating achievement of acceleration performance and maximum speed performance of high-performance vehicles or large vehicles and decreasing consumption of electricity thereby.

In accordance with the present disclosure, the above and other objects can be accomplished by the provision of a powertrain for a motorized vehicle, including a motor shaft connected to a motor, a first input shaft configured to be selectively connected to the motor shaft and provided with a first driving gear mounted on the first input shaft, a second input shaft configured to be selectively connected to the motor shaft and provided with a second driving gear mounted on the second input shaft, a planetary gear set connected to the first input shaft and mounted so as to allow power from the motor shaft to be supplied via a plurality of paths, a first driven gear mounted to a differential and configured to mesh with the first driving gear, and a second driven gear mounted to the differential and configured to mesh with the second driving gear.

The planetary gear set may include three rotating elements. The three rotating elements may be a sun gear, a carrier, and a ring gear, and the differential may be connected to the carrier via the first driven gear, the first driving gear, and the first input shaft.

The sun gear may be directly connected to the motor shaft, the carrier may be selectively connected to the motor shaft, and the ring gear may be selectively secured to a case.

The carrier may be selectively connected to the motor shaft via a first clutch, the second input shaft may be selectively connected to the motor shaft via a second clutch, and the ring gear may be selectively secured to the case by a brake.

The carrier may be selectively connected to the motor shaft via a first clutch, the second input shaft may be selectively connected to the motor shaft via a second clutch, and the ring gear may be selectively secured to the case by a dog clutch and a one-way clutch, which are mounted in parallel between the ring gear and the case.

The carrier and the second input shaft may be selectively connected to the motor shaft via a first dog clutch and a second dog clutch, each of which is engaged and disengaged by a sleeve configured to perform bidirectional and linear sliding motion on the motor shaft, and the ring gear may be selectively secured to the case by a brake.

The sun gear may be selectively secured to the case, the carrier may be selectively connected to the motor shaft, and the ring gear may be directly connected to the motor shaft.

The carrier may be selectively connected to the motor shaft via a first clutch, the second input shaft may be selectively connected to the motor shaft via a second clutch, and the sun gear may be selectively secured to the case by a brake.

The carrier may be selectively connected to the motor shaft via a first clutch, the second input shaft may be selectively connected to the motor shaft via a second clutch, and the sun gear is selectively secured to the case by a dog clutch and a one-way clutch, which are mounted in parallel between the sun gear and the case.

The sun gear may be selectively connected to the motor shaft, the carrier may be selectively connected to the motor shaft, and the ring gear may be secured to the case.

The carrier may be selectively connected to the motor shaft via a first clutch, the second input shaft may be selectively connected to the motor shaft via a second clutch, and the sun gear may be selectively connected to the motor shaft via a third clutch.

The carrier may be selectively connected to the motor shaft via a first clutch, the second input shaft may be selectively connected to the motor shaft via a second clutch, and the sun gear may be selectively connected to the motor shaft via a dog clutch and a one-way clutch, which are mounted in parallel.

The carrier may be selectively connected to the motor shaft, the ring gear may be selectively connected to the motor shaft, and the sun gear may be secured to the case.

The carrier may be selectively connected to the motor shaft via a first clutch, the second input shaft may be selectively connected to the motor shaft via a second clutch, and the ring gear may be selectively connected to the motor shaft via a third clutch.

The carrier may be selectively connected to the motor shaft via a first clutch, the second input shaft may be selectively connected to the motor shaft via a second clutch, and the ring gear may be selectively connected to the motor shaft via a dog clutch and a one-way clutch, which are mounted in parallel.

The planetary gear set may be implemented as a double-pinion planetary gear set, the sun gear may be selectively secured to the case, the carrier may be directly connected to the motor shaft, and the ring gear may be selectively connected to the motor shaft.

The sun gear may be selectively secured to the case by a brake, the ring gear may be selectively connected to the motor shaft via a first clutch, and the second input shaft may be selectively connected to the motor shaft via a second clutch.

BRIEF DESCRIPTION OF THE DRAWINGS

The above and other objects, features and other advantages of the present disclosure will be more clearly understood from the following detailed description taken in conjunction with the accompanying drawings, in which:

FIG. 2 is an operating mode table of the first embodiment;

FIG. 9 is an operating mode table of the third embodiment;

FIG. 13 is an operating mode table of the sixth embodiment;

DETAILED DESCRIPTION OF THE PREFERRED EMBODIMENTS

Figure 1:
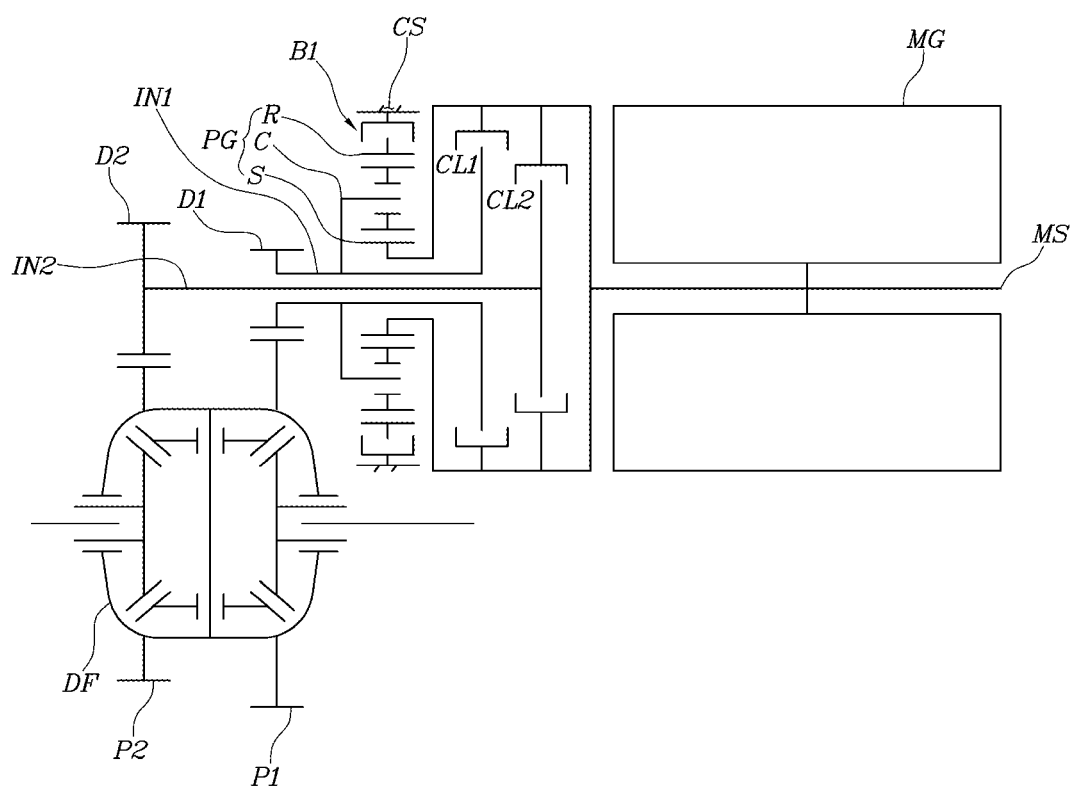
FIG. 1 is a view illustrating the construction of a first embodiment of a powertrain for a motorized vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternative forms, and should not be construed as being limited to the exemplary embodiments set forth herein.

Accordingly, while exemplary embodiments of the disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Referring to FIG. 1, a first embodiment of a powertrain for a motorized vehicle according to the present disclosure includes a motor shaft MS, which is connected to a motor MG, a first input shaft IN1, which is selectively connected to the motor shaft MS and is provided with a first driving gear D1 mounted on the first input shaft IN1, a second input shaft IN2, which is selectively connected to the motor shaft MS and is provided with a second driving gear D2 mounted on the second input shaft IN2, a planetary gear set PG, which is mounted so as to be connected to the first input shaft IN1 and to allow power from the motor shaft MS to be supplied via a plurality of paths, a first driven gear P1, which is mounted to a differential DF and meshes with the first driving gear D1, and a second driven gear P2, which is mounted to the differential DF and meshes with the second driving gear D2.

The planetary gear set PG includes three rotating elements, i.e., a sun gear S, a carrier C, and a ring gear R. The differential DF is connected to the carrier C via the first driven gear P1, the first driving gear D1, and the first input shaft IN1.

In the embodiment, the sun gear S is directly connected to the motor shaft MS, the carrier C is selectively connected to the motor shaft MS, and the ring gear R is selectively secured to the case CS.

The carrier C is selectively connected to the motor shaft MS via a first clutch CL1, the second input shaft IN2 is selectively connected to the motor shaft MS via a second clutch CL2, and the ring gear R is selectively secured to the case CS by a brake B1.

Figure 3:
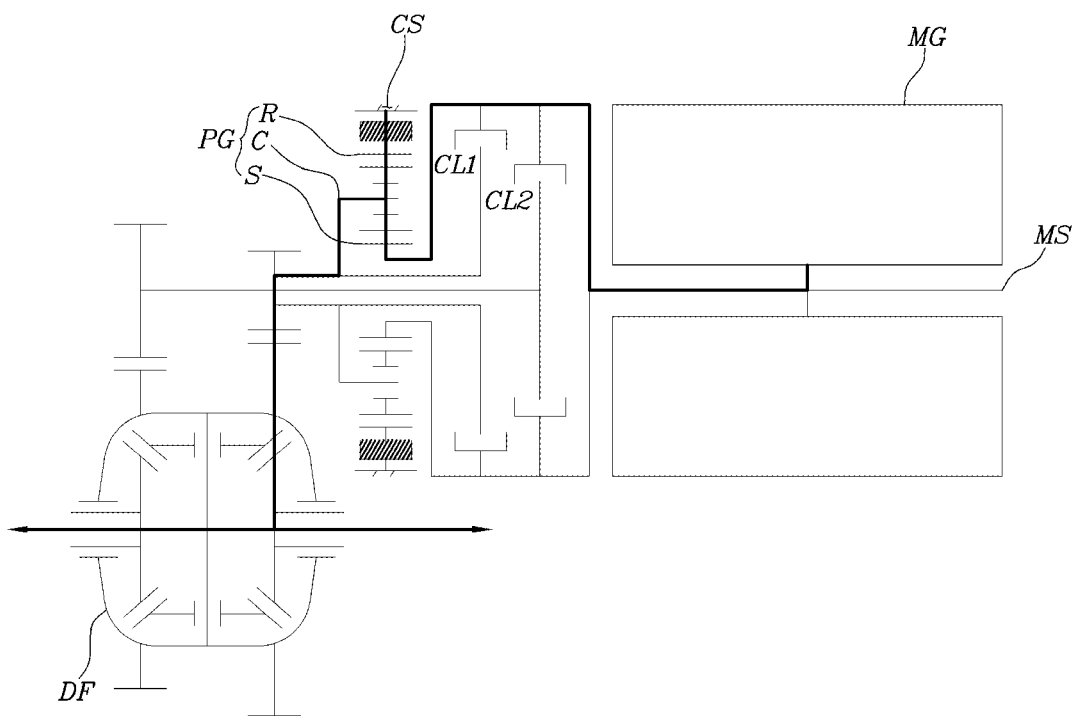
FIG. 3 is a view illustrating realization of a first gear stage in the first embodiment.
Figure 4:
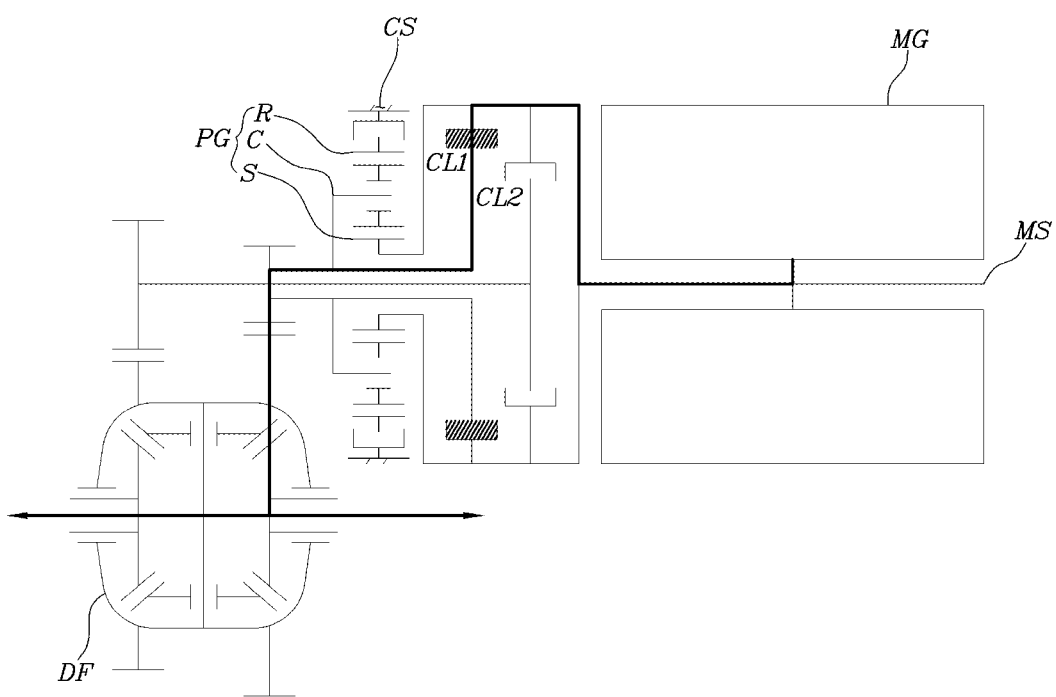
FIG. 4 is a view illustrating realization of a second gear stage in the first embodiment.
Figure 5:
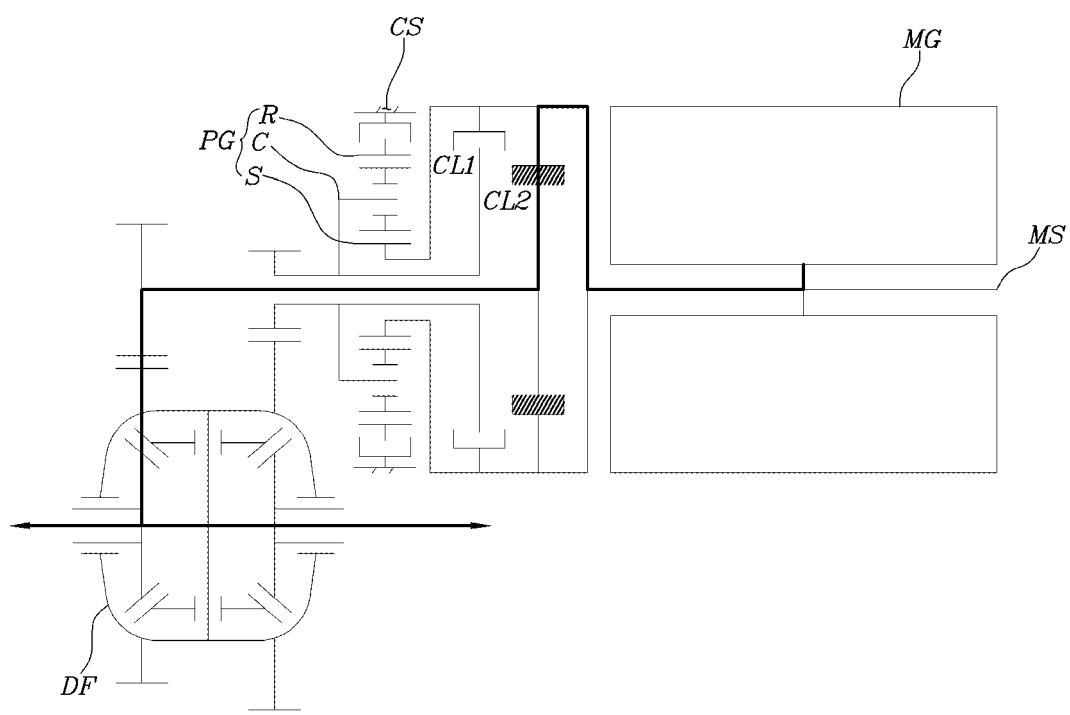
FIG. 5 is a view illustrating realization of a third gear stage in the first embodiment.

The embodiment is capable of realizing first to third gear stages according to the operating mode table shown in FIG. 2. FIGS. 3 to 5 respectively illustrate realization of the first to third gear stages.

As described above, the powertrain according to the embodiment of the present disclosure employs a two-shaft structure in which the motor and the planetary gear set PG are disposed at a first shaft and the differential DF is disposed at a second shaft, thus having a more compact construction than a three-shaft structure, thereby improving mountability thereof in a vehicle and enabling a sufficiently large indoor passenger compartment to be secured in the vehicle. Further, the embodiment provides shift ratios of the first to third gear stages, thereby facilitating achievement of acceleration performance and maximum speed performance of high-performance vehicles or large vehicles and decreasing consumption of electricity thereby.

For reference, it is to be understood that the first clutch CL1, the second clutch CL2, and the third clutch CL3 mentioned below are not distinguished based on components that are connected to each other via the clutches, and the terms "first", "second", and "third" are only used to distinguish one clutch from other clutches in each embodiment.

Further, the first clutch CL1, the second clutch CL2, the third clutch CL3, and the brake B1 are components that transmit power or form restraining force using frictional force. Each of these components may be collectively referred to as a "friction element". The dog clutch and the one-way clutch OWC, which will be described later, are components that are distinguished from the friction element.

Figure 6:
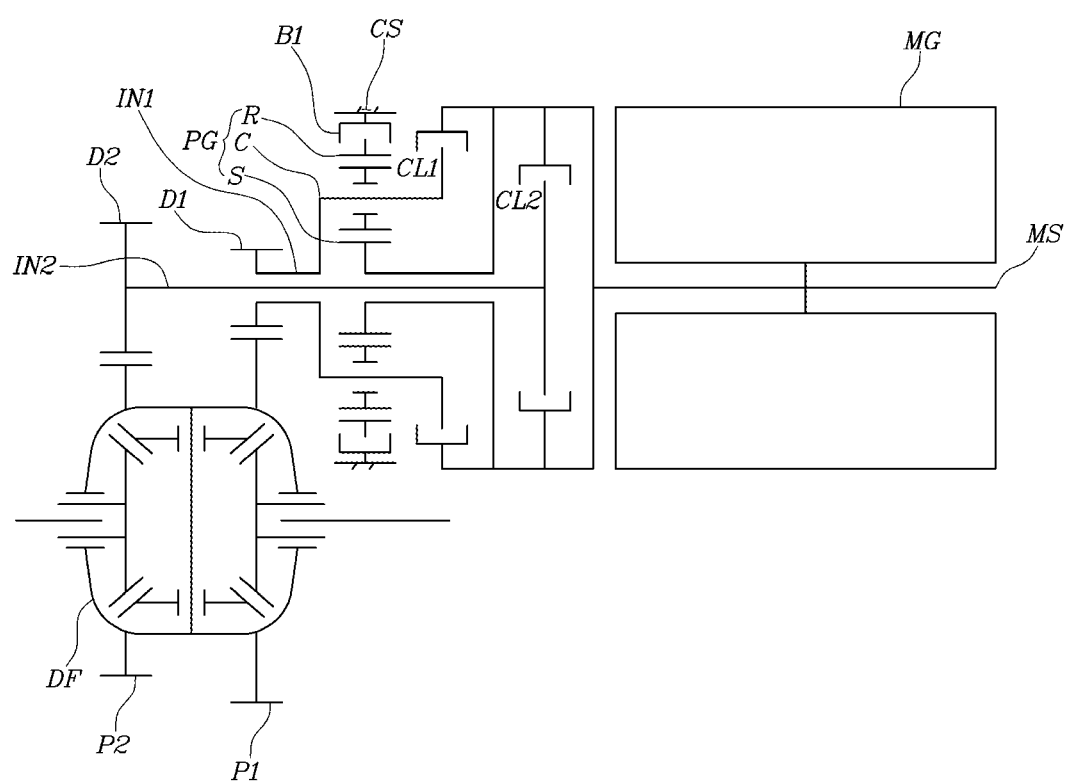
FIG. 6 is a view illustrating the construction of a modified example of the first embodiment.

FIG. 6 illustrates a modified example of the first embodiment. The component connection structure of the modified example is fundamentally the same as that of the first embodiment, except that the first clutch CL1 is connected to the carrier C.

Figure 7:
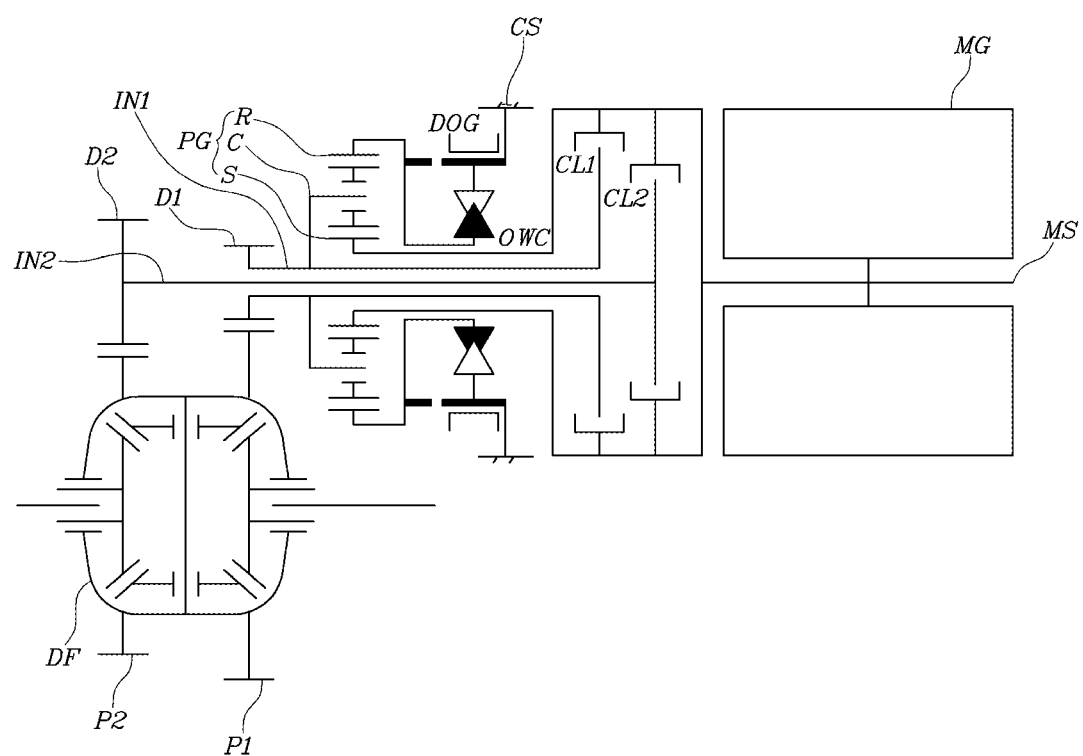
FIG. 7 is a view illustrating the construction of a second embodiment of a powertrain for a motorized vehicle according to the present disclosure.

FIG. 7 illustrates a second embodiment of the present disclosure, which is constructed such that the carrier C is selectively connected to the motor shaft MS via a first clutch CL1, the second input shaft IN2 is selectively connected to the motor shaft MS via a second clutch CL2, and the ring gear R is selectively secured to the case CS by a dog clutch DOG and a one-way clutch OWC, which are mounted in parallel between the ring gear R and the case CS.

Figure 8:
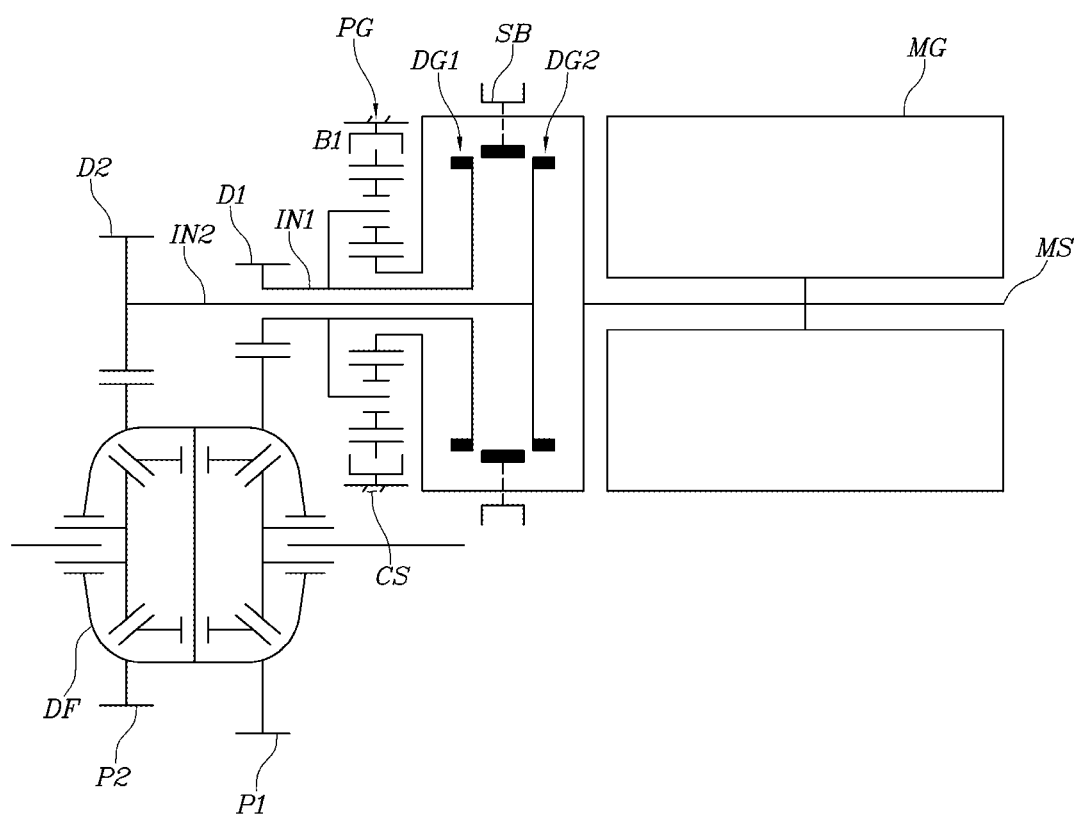
FIG. 8 is a view illustrating the construction of a third embodiment of a powertrain for a motorized vehicle according to the present disclosure.

FIG. 8 illustrates a third embodiment of the present disclosure, which is constructed such that the carrier C and the second input shaft IN2 are selectively connected to the motor shaft MS via a first dog clutch DG1 and a second dog clutch DG2, each of which is engaged and disengaged by a sleeve SB configured to perform bidirectional and linear sliding motion on the motor shaft MS, and the ring gear R is selectively secured to the case CS by a brake B1.

In other words, the structure of the third embodiment is the same as that of the first embodiment, except that the first dog clutch DG1 and the second dog clutch DG2, each of which is engaged and disengaged by the sleeve SB performing bidirectional sliding motion, are used in place of the first clutch CL1 and the second clutch CL2 of the first embodiment.

Here, the first dog clutch DG1 and the second dog clutch DG2 are components that are distinguished from the dog clutch DOG, which is mounted parallel to the one-way clutch OWC in the second embodiment shown in FIG. 7.

According to this embodiment, the powertrain may be constructed at lower cost, and no power is consumed to maintain frictional force of the friction clutches, such as the first clutch CL1 and the second clutch CL2, during travel of the vehicle, thus making it possible to improve the fuel efficiency of the vehicle.

Figure 10:
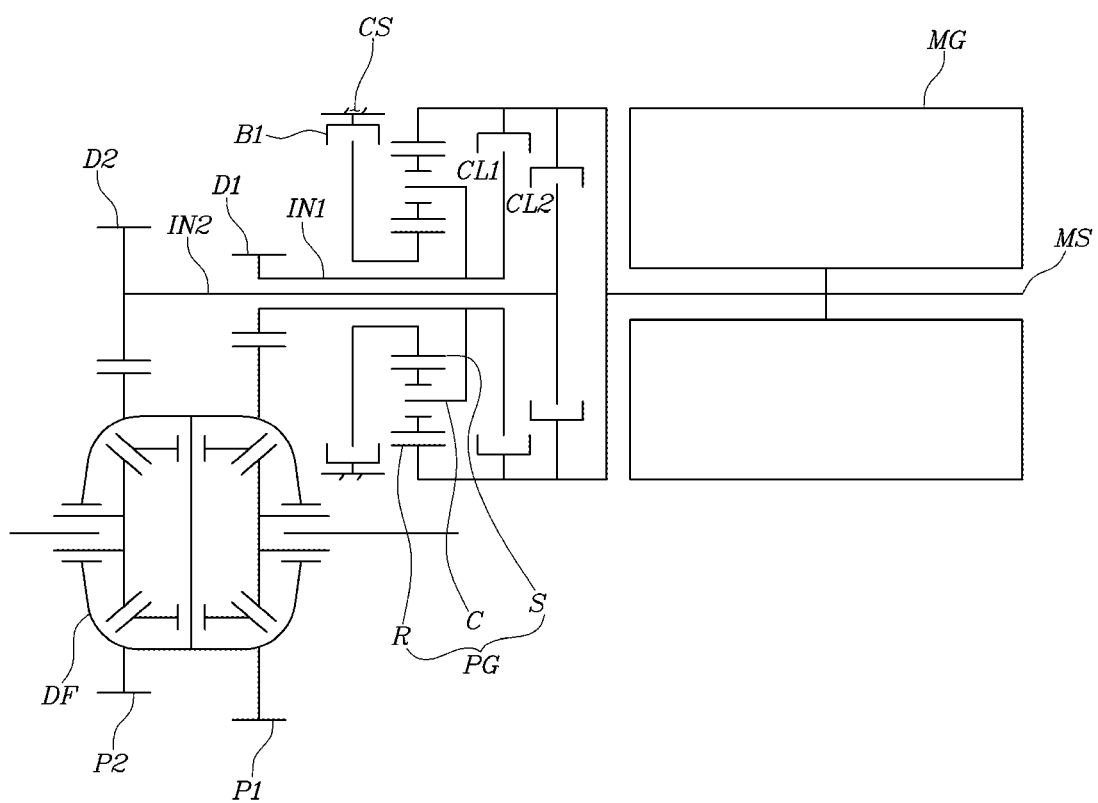
FIG. 10 is a view illustrating the construction of a fourth embodiment of a powertrain for a motorized vehicle according to the present disclosure.

FIG. 10 illustrates a fourth embodiment of the present disclosure. The structure of the fourth embodiment is the same as that of the first embodiment, except that the sun gear S and the ring gear R are interchanged with each other with regard to the arrangement thereof. Specifically, the sun gear S is selectively secured to the case CS, the carrier C is selectively connected to the motor shaft MS, and the ring gear R is directly connected to the motor shaft MS.

Here, the carrier C is selectively connected to the motor shaft MS via a first clutch CL1, the second input shaft IN2 is selectively connected to the motor shaft MS via a second clutch CL2, and the sun gear S is selectively secured to the case CS by a brake B1.

Figure 11:
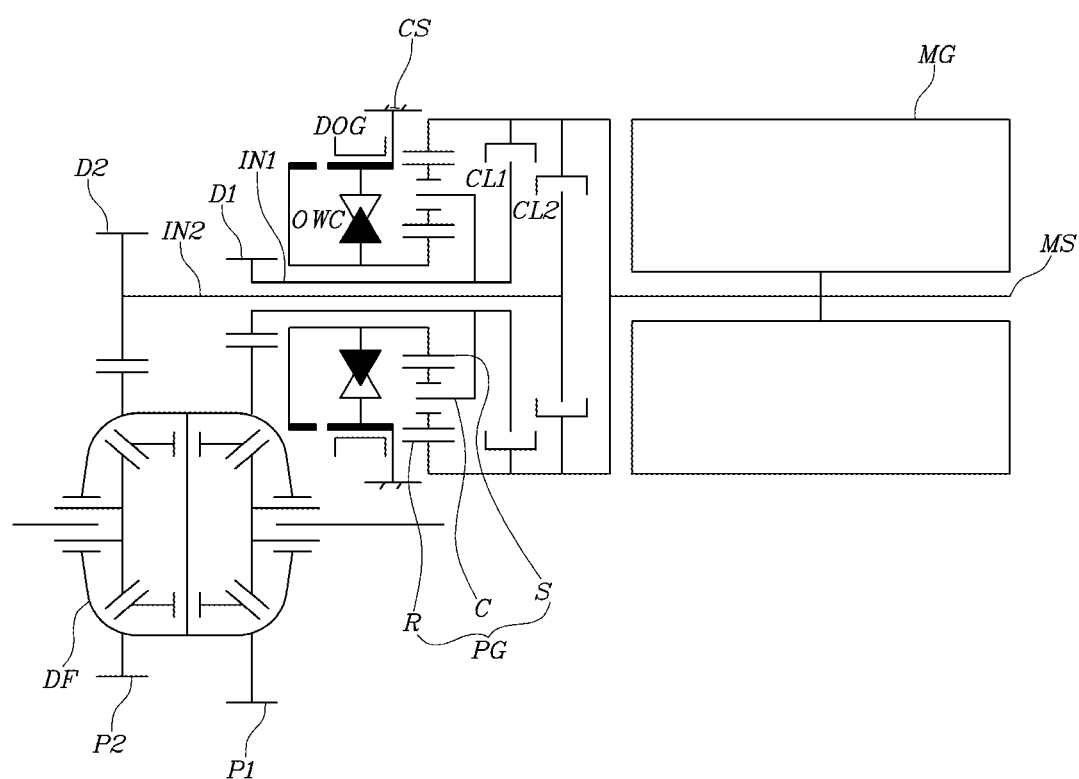
FIG. 11 is a view illustrating the construction of a fifth embodiment of a powertrain for a motorized vehicle according to the present disclosure.

FIG. 11 illustrates a fifth embodiment of the present disclosure. The structure of the fifth embodiment is the same as that of the fourth embodiment, except that the brake B1 is substituted with a one-way clutch OWC and a dog clutch DOG. Specifically, the carrier C is selectively connected to the motor shaft MS via a first clutch CL1, the second input shaft IN2 is selectively connected to the motor shaft MS via a second clutch CL2, and the sun gear S is selectively secured to the case CS by a dog clutch DOG and a one-way clutch OWC, which are mounted in parallel between the sun gear S and the case CS.

Figure 12:
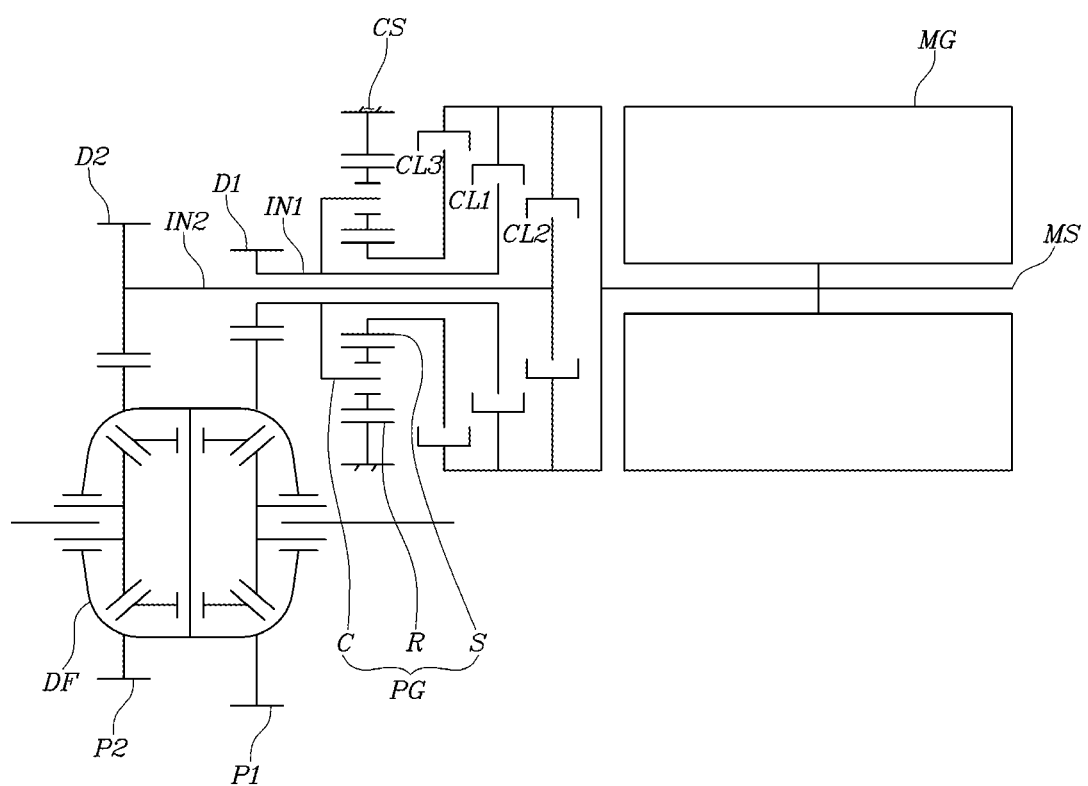
FIG. 12 is a view illustrating the construction of a sixth embodiment of a powertrain for a motorized vehicle according to the present disclosure.

FIG. 12 illustrates a sixth embodiment of the present disclosure. The structure of the sixth embodiment is the same as that of the first embodiment, except that, among the three rotating elements of the planetary gear set PG, each of the first rotating element and the second rotating element is selectively connected to the motor shaft MS, and the third rotating element is secured to the case CS.

In other words, the planetary gear set PG is constructed such that the first rotating element is a sun gear S, the second rotating element is a carrier C, and the third rotating element is a ring gear R, the sun gear S is selectively connected to the motor shaft MS via a third clutch CL3, the carrier C is selectively connected to the motor shaft MS via a first clutch CL1, and the second input shaft IN2 is selectively connected to the motor shaft MS via a second clutch CL2.

This embodiment is capable of realizing first to third gear stages according to the operating mode table shown in FIG. 13. Similar to the first embodiment, this embodiment employs a two-shaft structure in which the motor and the planetary gear set PG are disposed at a first shaft and the differential DF is disposed at a second shaft, thus having a more compact construction than a three-shaft structure, thereby improving mountability thereof in a vehicle and enabling a sufficiently large indoor passenger compartment to be secured in the vehicle. Further, this embodiment provides shift ratios of the first to third gear stages, thereby facilitating achievement of acceleration performance and maximum speed performance of high-performance vehicles or large vehicles and decreasing consumption of electricity thereby.

Figure 14:
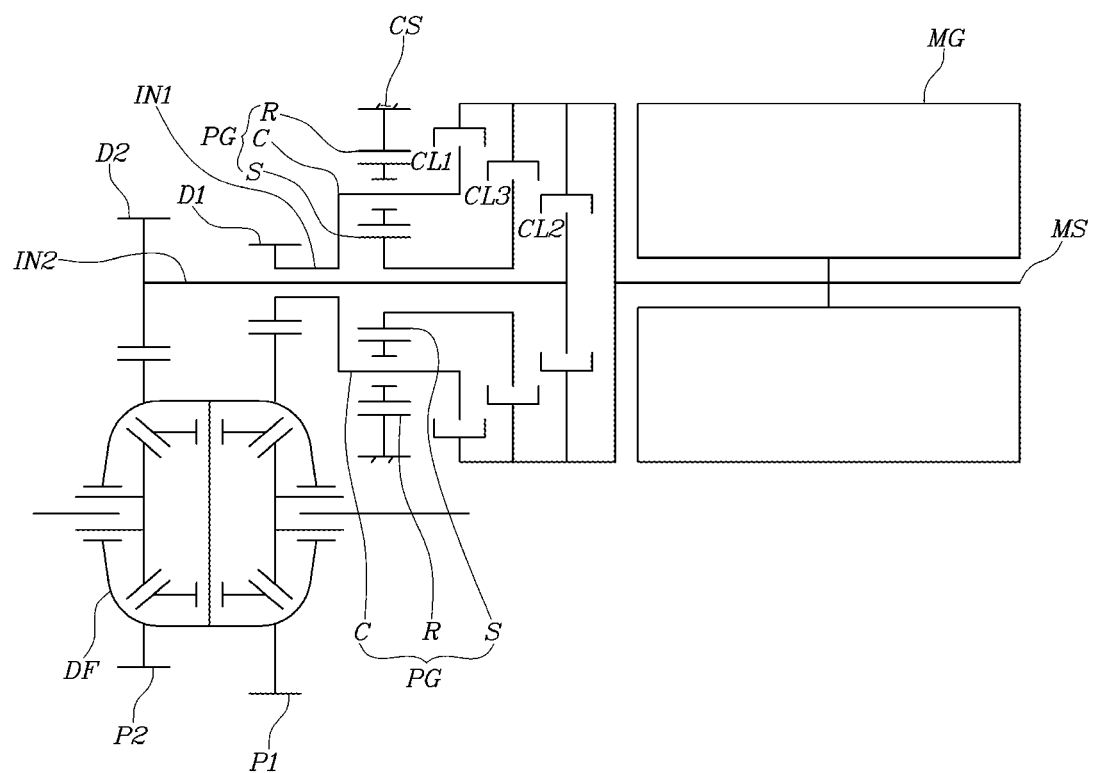
FIG. 14 is a view illustrating the construction of a modified example of the sixth embodiment.

FIG. 14 illustrates a modified example of the sixth embodiment. The component connection structure of the modified example is fundamentally the same as that of the sixth embodiment, except that the first clutch CL1 is connected to the carrier C.

Figure 15:
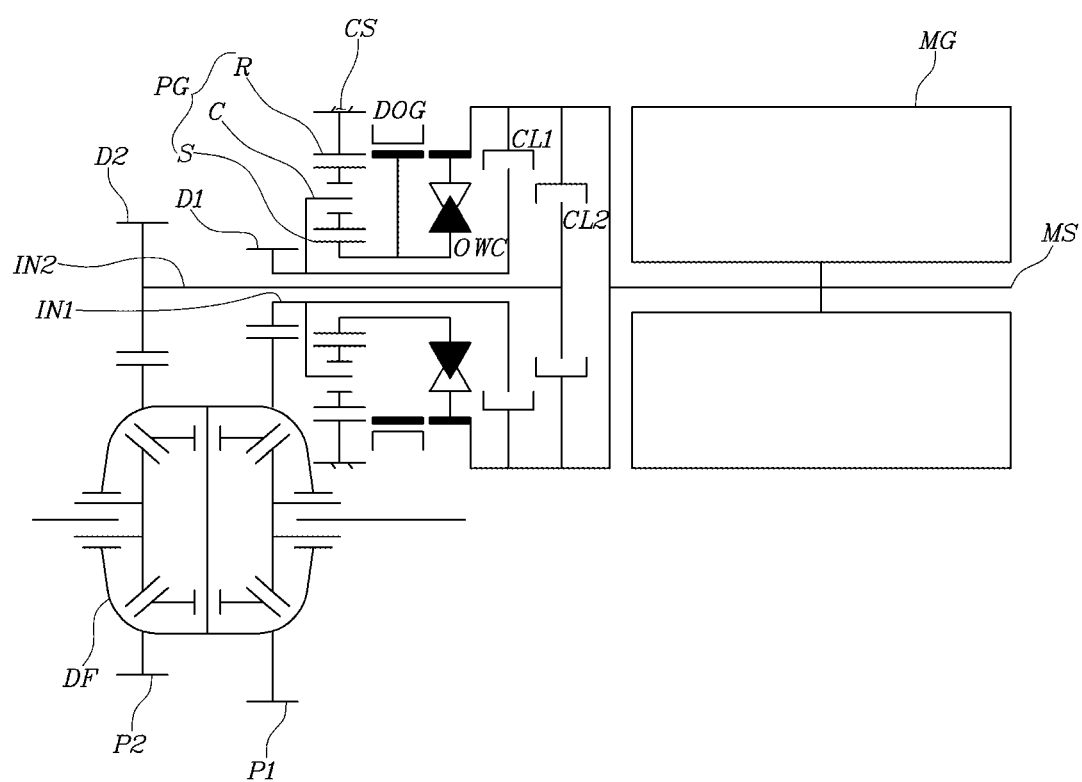
FIG. 15 is a view illustrating the construction of a seventh embodiment of a powertrain for a motorized vehicle according to the present disclosure.

FIG. 15 illustrates a seventh embodiment of the present disclosure. The structure of the seventh embodiment is the same as that of the sixth embodiment, except that the third clutch CL3 is substituted with a dog clutch DOG and a one-way clutch OWC. Specifically, the sun gear S is selectively connected to the motor shaft MS via a dog clutch DOG and a one-way clutch OWC, which are mounted in parallel, the carrier C is selectively connected to the motor shaft MS via a first clutch CL1, and the second input shaft IN2 is selectively connected to the motor shaft MS via a second clutch CL2.

Figure 16:
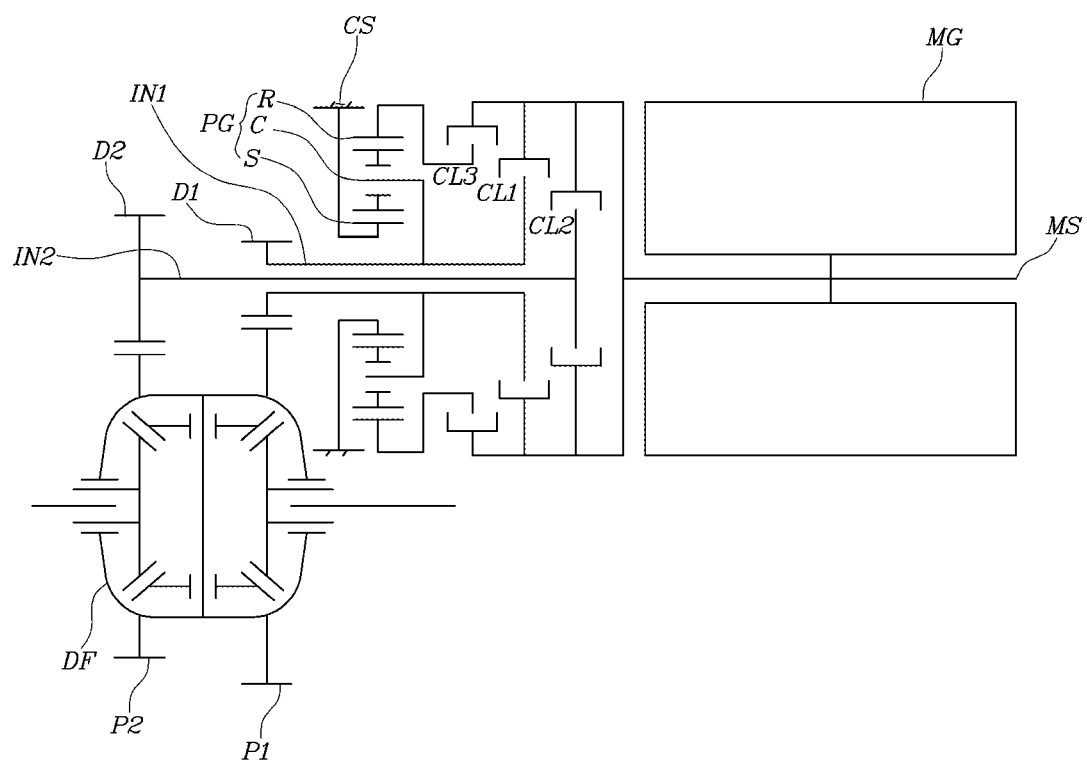
FIG. 16 is a view illustrating the construction of an eighth embodiment of a powertrain for a motorized vehicle according to the present disclosure.

FIG. 16 illustrates an eighth embodiment of the present disclosure. The structure of the eighth embodiment is the same as that of the sixth embodiment, except that the sun gear S and the carrier C are interchanged with each other with regard to the arrangement thereof. Specifically, the sun gear S is secured to the case CS, and each of the carrier C and the ring gear R is selectively connected to the motor shaft MS.

In other words, the ring gear R is selectively connected to the motor shaft MS via a third clutch CL3, the carrier C is selectively connected to the motor shaft MS via a first clutch CL1, and the second input shaft IN2 is selectively connected to the motor shaft MS via a second clutch CL2.

Figure 17:
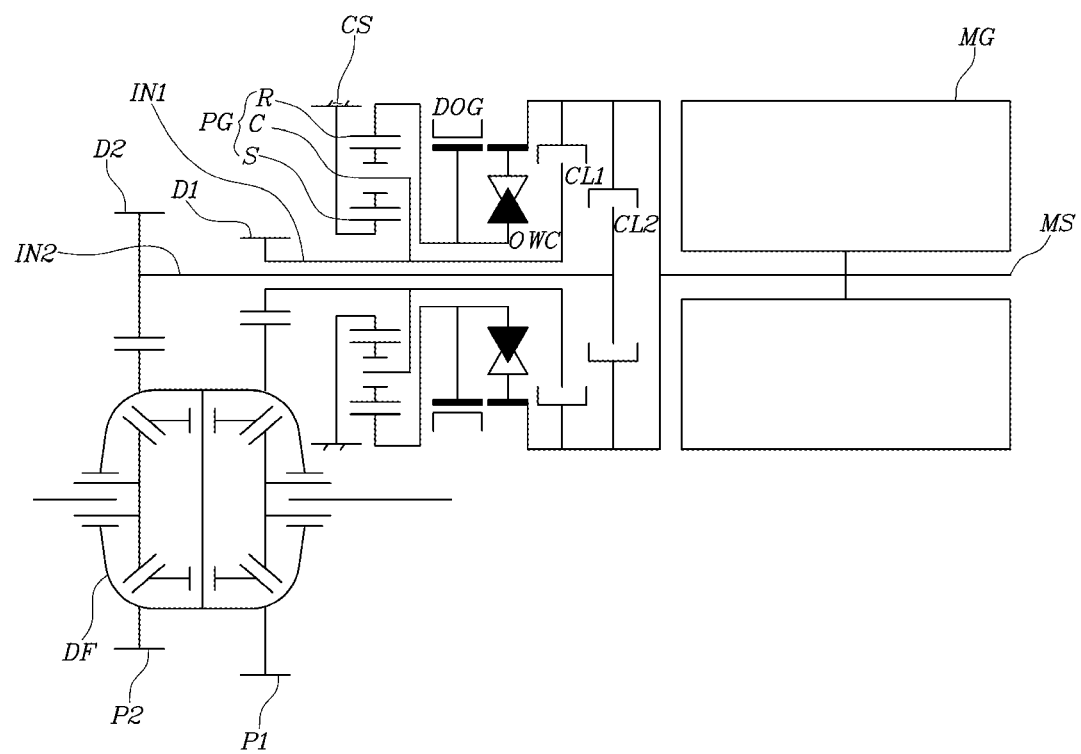
FIG. 17 is a view illustrating the construction of a ninth embodiment of a powertrain for a motorized vehicle according to the present disclosure.

FIG. 17 illustrates a ninth embodiment of the present disclosure. The structure of the ninth embodiment is the same as that of the eighth embodiment, except that the third clutch CL3 is substituted with a one-way clutch OWC and a dog clutch DOG. Specifically, the ring gear R is selectively connected to the motor shaft MS via a dog clutch DOG and a one-way clutch OWC, which are mounted in parallel.

Figure 18:
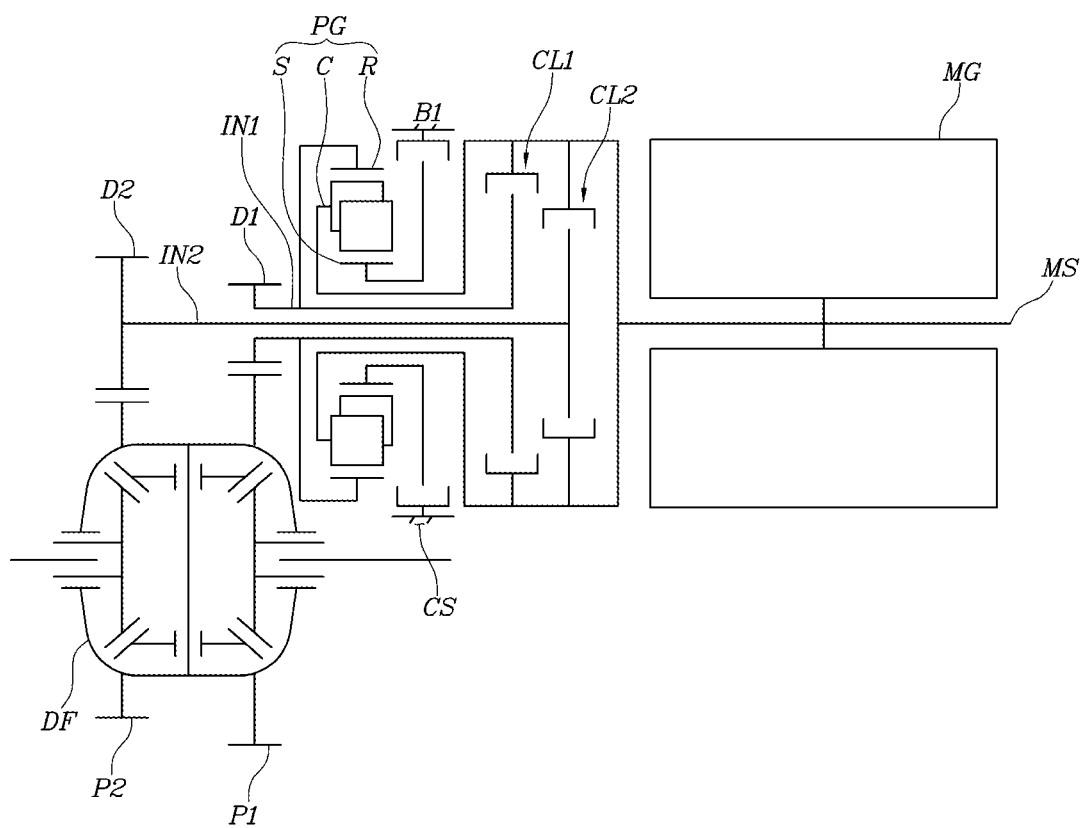
FIG. 18 is a view illustrating the construction of a tenth embodiment of a powertrain for a motorized vehicle according to the present disclosure.

FIG. 18 illustrates a tenth embodiment of the present disclosure, which has a structure similar to that of the first embodiment. The first embodiment employs a single-pinion planetary gear set as the planetary gear set PG, whereas this embodiment employs a double-pinion planetary gear set as the planetary gear set PG.

In other words, in this embodiment, the planetary gear set PG is implemented as a double-pinion planetary gear set, the sun gear S is selectively secured to the case CS, the carrier C is directly connected to the motor shaft MS, and the ring gear R is selectively connected to the motor shaft MS.

The sun gear S is selectively secured to the case CS by a brake B1, the ring gear R is selectively connected to the motor shaft MS via a first clutch CL1, and the second input shaft is selectively connected to the motor shaft MS via a second clutch CL2.

As is apparent from the above description, a powertrain for a motorized vehicle according to the present disclosure has a comparatively compact construction, thereby improving mountability thereof in a vehicle and enabling a sufficiently large indoor passenger compartment to be secured in the vehicle, and provides a plurality of gear stages, thereby facilitating achievement of acceleration performance and maximum speed performance of high-performance vehicles or large vehicles and decreasing consumption of electricity thereby.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A powertrain for a motorized vehicle, the powertrain comprising:
   a motor shaft connected to a motor;
   a first input shaft configured to be selectively connected to the motor shaft, the first input shaft being provided with a first driving gear mounted on the first input shaft;
   a second input shaft configured to be selectively connected to the motor shaft, the second input shaft being provided with a second driving gear mounted on the second input shaft;
   a planetary gear set directly connected to the first input shaft, the planetary gear set being mounted so as to allow power from the motor shaft to be supplied via a plurality of paths;
   a first driven gear mounted to a differential, the first driven gear meshing with the first driving gear; and
   a second driven gear mounted to the differential, the second driven gear meshing with the second driving gear;
   wherein the planetary gear set comprises three rotating elements, the three rotating elements being a sun gear, a carrier, and a ring gear;
   wherein the differential is connected to the carrier via the first driven gear, the first driving gear, and the first input shaft;

wherein the sun gear is directly connected to the motor shaft, wherein the carrier is selectively connected to the motor shaft, and wherein the ring gear is selectively secured to a case.

2. The powertrain according to claim 1, wherein:

the carrier is selectively connected to the motor shaft via a first clutch, the second input shaft is selectively connected to the motor shaft via a second clutch, and the ring gear is selectively secured to the case by a brake.

3. The powertrain according to claim 1, wherein:

the carrier is selectively connected to the motor shaft via a first clutch, the second input shaft is selectively connected to the motor shaft via a second clutch, and the ring gear is selectively secured to the case by a dog clutch and a one-way clutch, the dog clutch and the one-way clutch being mounted in parallel between the ring gear and the case.

4. The powertrain according to claim 1, wherein:

the carrier and the second input shaft are selectively connected to the motor shaft via a first dog clutch and a second dog clutch, each of the first dog clutch and the second dog clutch being engaged and disengaged by a sleeve configured to perform a bidirectional and linear sliding motion on the motor shaft, and the ring gear is selectively secured to the case by a brake.

* * * * *